Oct. 4, 1949.  T. A. KESTELL  2,483,774
CHANGE-SPEED GEAR
Filed Sept. 20, 1945  2 Sheets-Sheet 1
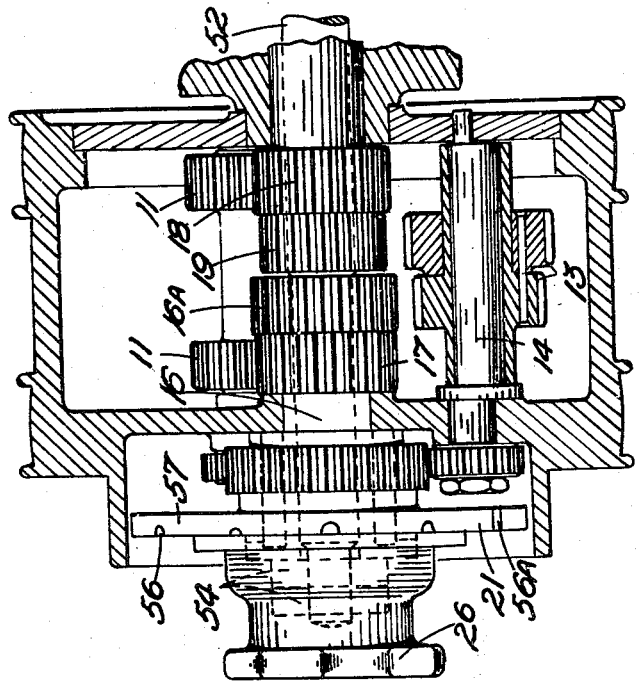
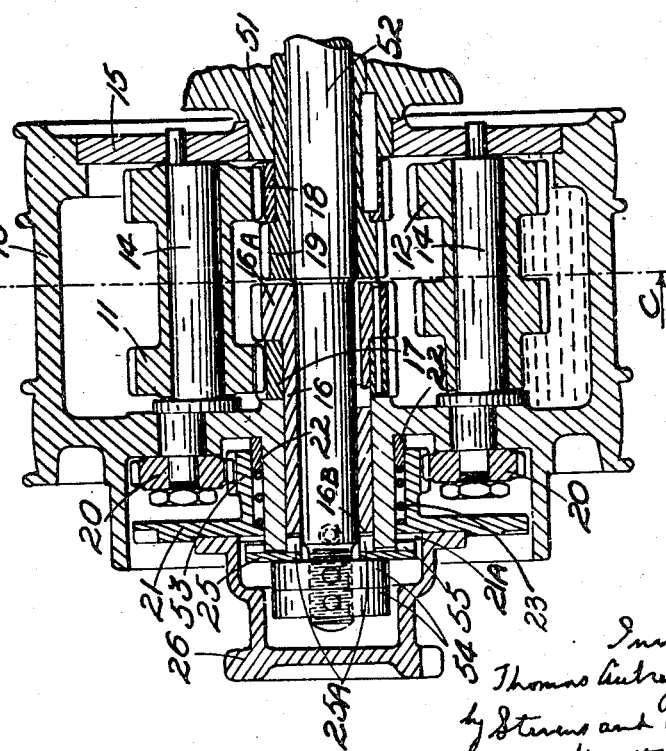
Inventor
Thomas Aubrey Kestell
by Stevens and Davis
his attys

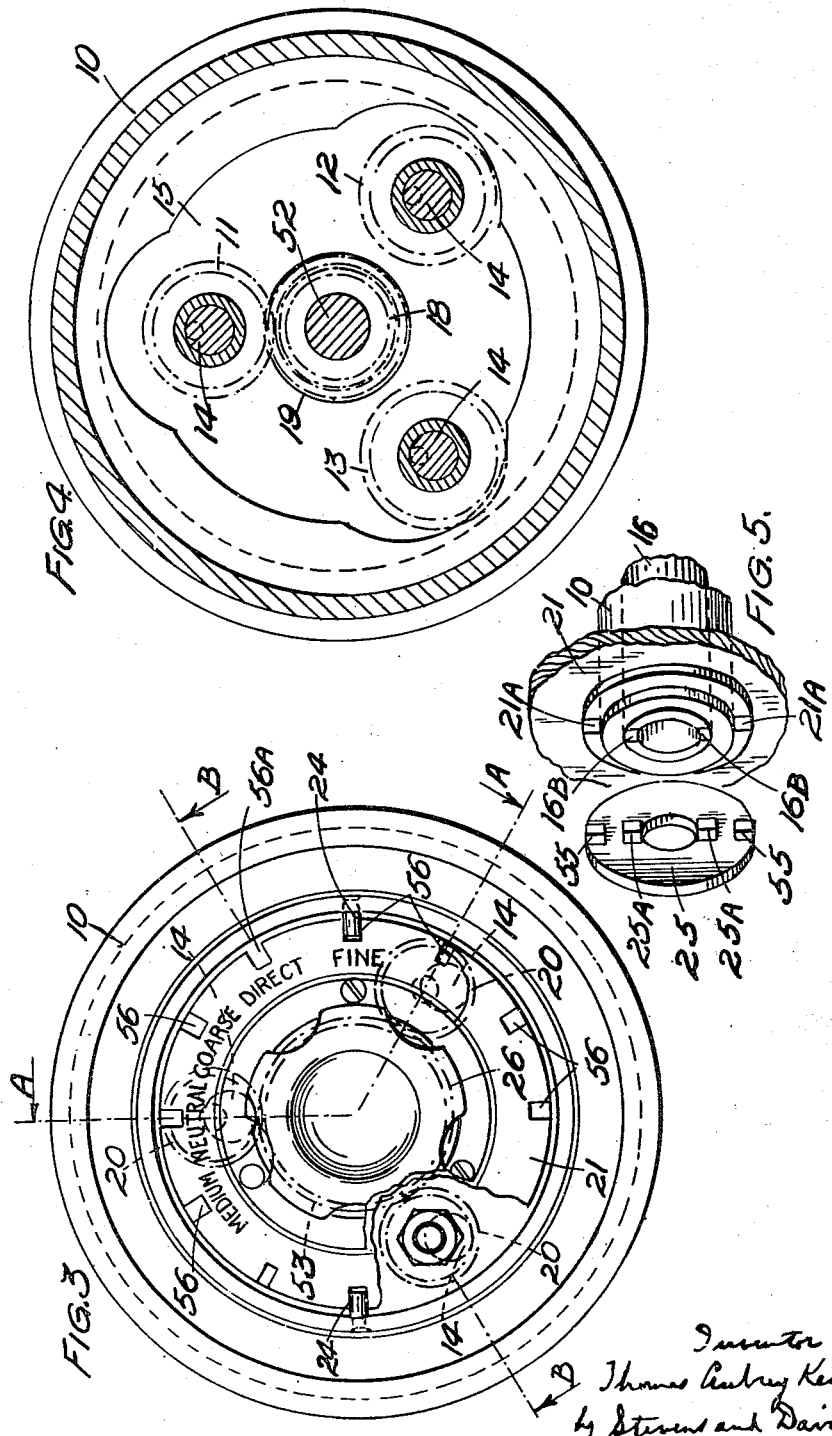

Patented Oct. 4, 1949

2,483,774

UNITED STATES PATENT OFFICE 2,483,774

CHANGE-SPEED GEAR

Thomas Aubrey Kestell, Thurmaston, England, assignor to Power Jets (Research & Development) Limited, London, England Application September 20, 1945, Serial No. 617,516

10 Claims. (Cl. 74—750)

The present invention relates to improvements in change speed gears, for use more particularly in machine tools, for example as applied to the shaft of a lathe or the like, and an object of the invention is to provide a self contained and compact apparatus which is reliable and simple in operation and can be fitted to the driving shaft of a machine without the necessity of any substantial structural modifications in the said machine.

In order to achieve the above mentioned object the apparatus according to the invention comprises a rotatably mounted housing for a plurality of selectively operable trains of gears and means for coupling said housing to an output shaft through a selected train of gears.

The apparatus may also be adapted to enable the rotary housing to drive the shaft directly or to rotate idly.

Further advantages of the invention will appear from the following description of one form of embodiment thereof which is given by way of example and illustrated in the accompanying drawings in which:

Fig. 1 is a section of one form of embodiment of the apparatus on the line A—A of Fig. 3;

Fig. 2 is a section on the line B—B of Fig. 3;

Fig. 3 is a left hand end view of Fig. 1, with part broken away;

Fig. 4 is a section on the line C—C of Fig. 1;

Fig. 5 is a partial perspective view of a detail.

In Fig. 1, the housing is in the form of a pulley 10 adapted to be connected to an external main drive (not shown) and comprising three sets of double spur gears 11, 12, 13 (Fig. 2) spaced at 120° to each other and suitably toothed to give the different reduction ratios desired. Each set of double gears is mounted on a shaft 14 which is eccentrically journalled at one end in the pulley 10 and at the other end in an end cover plate 15 rigid with said pulley and journalled on an annular projection 51 on the frame of the machine. The eccentric mountings of the shafts 14 are themselves arranged at relative rotational phase displacements of 120 degrees.

The pulley 10 is journalled on a sleeve gear 16 which is keyed to the output shaft 52 and which is also rigid with a further gear 17 adapted to mesh when desired with one set of teeth of the double gears 11 above mentioned. The other teeth of the said double gear 11 are adapted to mate when desired with a stationary pinion 18 rigid with a bush gear 19 which is fixed to the frame of the machine and in which the output shaft of the machine is journalled.

The left hand ends of the eccentric double gear shafts 14 are keyed to pinions 20 meshing with teeth on an annular extension 53 of a control plate 21 which is journalled on the boss of the pulley 10 and on a bush 22 provided on said boss.

The control plate 21 is urged outwardly by a spring 23 into engagement with two diametrically opposite pins 24 (Fig. 3) fixed in the pulley 10 and engaging with slots 56 suitably arranged around the circumference of the control plate 21, one pair of diametrically opposite slots being provided for each gear as well as additional pairs of slots for direct drive and for neutral drive.

A washer or clutch plate 25 on the output shaft 52 is rigidly connected through tongues 25A and slots 16B respectively with the sleeve gear 16, the latter being keyed and the two finally secured to said output shaft by locknuts 54. The clutch plate 25 is provided with two outer projections 55 (seen more clearly in Fig. 5) which can engage slots 21A in the control plate 21.

A control knob 26 is fixed to said plate 21 and when said knob is pressed against the resistance of the spring 23, the slots 56 in the control plate 21 are disengaged from the pins 24 and by subsequently turning the knob 26, the plate 21 may be rotated bringing alternative slots into engagement with the pins 24 fixed on the pulley 10.

Rotation of the control plate 21 rotates the pinions 20 through the sleeve gear 53 hence rotating the eccentric double gear shafts 14. One of the gears (having for example 35 teeth) of the double gear 11 is shown in Fig. 1 as mating with the pinion 18 (also having 35 teeth) and the other (of for example 34 teeth) with pinion 17 (having for example 36 teeth) on the sleeve 16. On rotation of the shafts 14 the double gear 11 is disengaged from the pinions 17 and 18 and one or other of the double gears 12 or 13 are brought into mesh with their corresponding mating gears.

When one gear of 12 (with for example 35 teeth) is engaged with the gear 18 (having also 35 teeth) on the output shaft, the second gear of 12 (with for example 33 teeth) meshes with gear 16A (with for example 37 teeth) on the sleeve 16.

When one gear of 13 (with for example 38 teeth) is engaged with the gear 19 (with for example 32 teeth) on the output shaft, the second gear of 13 (having 33 teeth) meshes with the gear 16A as in the case of the double gear 12.

The eccentric shafts 14 rotate through twice the angle of rotation of the control plate 21 so that with three sets of gear which engage consecutively, the slots 56 in the control plate 21 are arranged 60° apart and half way between each of these are additional slots for no drive and slots 56A for direct drive (Fig. 3).

The slots 56 for the various gear drives and neutral are not cut right through the control plate 21 so that the remaining portion 57 forms an outward stop for the said plate. The slots 56A (Fig. 2) for direct drive, however, are cut right through the plate 21 so that for this position the plate performs a further outward movement which allows projections 55 to enter slots 21A (Fig. 5) on the control plate 21, thus directly connecting the pulley 10 to the output shaft 52 through sleeve 16.

As drawn, the reduction ratio in use is 18:1, gear 11 being in mesh with gear 18 and with gear 17.

In order to change gear the control knob 26 is pressed inwards, thus disengaging control plate 21 which is then turned by means of knob 26 thus disengaging the gear being used, and this rotation is continued until the slot 56 corresponding to the required gear comes into line with pin 24 whereupon knob 26 is released so that pin 24 engages with the said slot 56 and the apparatus can then be operated with the new gear.

The apparatus as described is thus a compact self-contained device which may be fitted to any existing machine after only slight modification to the shaft and frame of said machine, and when fitted need occupy no more space than the existing drive pulley. It may be adapted to provide any desired number of gear ratios according to the number of gear trains provided and the selection of any one train of gears is a simple operation. The arrangement of pins and slots described ensures that only one gear can be engaged at a time and the arrangement also ensures reduced wear and overhang.

I claim:

1. Change speed gear comprising a rotatably mounted housing adapted to be driven by an external drive, a plurality of selectively operable gear trains within said housing, each gear train being associated with a shaft which is located eccentrically relative to said housing and is itself eccentrically borne by said housing, means for drivably connecting said housing to an output shaft and means for simultaneously rotating said eccentrically borne shafts to bring a selected gear train into operable engagement between said housing and said output shaft.

2. Change speed gear according to claim 1 wherein all said shafts are symmetrically borne around an axis.

3. Change speed gear according to claim 1 wherein adjacent gear trains have relatively equal phase displacements.

4. Charge speed gear comprising a rotatably mounted housing adapted to be driven by an external drive, a plurality of selectively operable gear trains within said housing, at least some gear elements of at least one gear train being associated with a shaft eccentrically borne by said housing, means for drivably connecting at least one of said gear elements of a train to an output shaft, a second gear element of said train being adapted to engage a third stationary gear element of said train, and a control plate operable to rotate said shaft and adapted to be releasably and selectively engaged with said housing in a plurality of selectively operable positions so as to bring a selected gear train into operable engagement between said housing and said output shaft.

5. Change speed gear comprising a rotatably mounted housing adapted to be driven by an external drive, a plurality of selectively operable gear trains within said housing, at least some gear elements of at least one gear train being associated with a shaft eccentrically borne by said housing, means for drivably connecting at least one of said gear elements to an output shaft, a second gear element being adapted to engage a third stationary gear element, a plurality of eccentrically mounted shafts symmetrically disposed around an axis each associated with a gear train, adjacent gear trains having relatively equal phase displacements, and a control plate operable to rotate said eccentric shafts when itself rotated to bring a selected gear train into operable engagement between said housing and said output shaft.

6. Change speed gear comprising a rotatably mounted housing adapted to be driven by an external drive, a plurality of selectively operable gear trains within said housing, at least some gear elements of at least one gear train being associated with a shaft eccentrically borne by said housing means for drivably connecting at least one of said gear elements to an output shaft, a second gear element being adapted to engage a third stationary gear element, a plurality of eccentrically mounted shafts symmetrically disposed around an axis each associated with a gear train, adjacent gear trains having relatively equal phase displacements, and a control plate operable to rotate said eccentric shafts and adapted to be releasably and selectively engaged with said housing in a plurality of selectively operable positions.

7. Change speed gear comprising a rotatably mounted housing adapted to drive an output shaft, a reaction element and a plurality of selectively operable gear trains within said housing, each gear train including at least one planet gear rotatably mounted on an eccentric portion of a shaft which shaft is itself eccentrically located with respect to and mounted in said housing, each said one planet gear being mounted on a different shaft, and means to rotate all the shafts simultaneously so as to bring a selected planet gear with its corresponding gear train into engagement between said reaction element and said output shaft.

8. Change speed gear according to claim 7 wherein the eccentrically mounted shafts are symmetrically disposed around the output shaft which enters coaxially within the housing.

9. Change speed gear according to claim 8 wherein the output shaft is adapted to engage said one planet gear of one gear train, said train having a second planet gear which is adapted to engage said reaction element.

10. Change speed gear according to claim 9 wherein the said one and second planet gears constitute a double spur gear mounted on one of the said eccentrically mounted shafts.

THOMAS AUBREY KESTELL.

REFERENCES CITED

The following references are of record in the file of this patent:

UNITED STATES PATENTS

| Number | Name | Date |
| --- | --- | --- |
| 437,068 | Whitton | Sept. 23, 1890 |

FOREIGN PATENTS

| Number | Country | Date |
| --- | --- | --- |
| 21,715 | Great Britain | Oct. 2, 1906 |